United States Patent
Chen et al.

(10) Patent No.: US 9,979,680 B2
(45) Date of Patent: May 22, 2018

(54) SMART NOTIFICATION SCHEDULING AND MODALITY SELECTION

(71) Applicant: FUJITSU LIMITED, Kawasaki-shi, Kanagawa (JP)

(72) Inventors: Cong Chen, Cupertino, CA (US); Ajay Chander, San Francisco, CA (US); Kanji Uchino, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/216,634

(22) Filed: Jul. 21, 2016

(65) Prior Publication Data
US 2018/0026920 A1    Jan. 25, 2018

(51) Int. Cl.
  *H04W 4/00* (2018.01)
  *H04L 12/58* (2006.01)
  *H04W 68/00* (2009.01)
  *H04L 29/08* (2006.01)
  *H04W 4/12* (2009.01)

(52) U.S. Cl.
  CPC .............. *H04L 51/04* (2013.01); *H04L 51/26* (2013.01); *H04L 67/26* (2013.01); *H04W 4/12* (2013.01); *H04W 68/005* (2013.01)

(58) Field of Classification Search
  CPC ......... H04M 1/72519; H04M 1/72583; H04M 1/72522; H04M 1/72547; H04M 4/02; H04M 4/12; H04M 4/14; H04M 88/184
  USPC ..................................... 455/466, 566, 414.1
  See application file for complete search history.

(56) References Cited

U.S. PATENT DOCUMENTS

| | | | |
|---|---|---|---|
| 7,073,129 B1 | 7/2006 | Robarts et al. | |
| 7,913,182 B2 * | 3/2011 | Bear | G06Q 10/107 345/1.1 |
| 8,239,874 B2 | 8/2012 | Anderson et al. | |
| 8,615,221 B1 * | 12/2013 | Cosenza | H04M 3/42 455/414.1 |
| 9,317,405 B2 | 4/2016 | Yoshida | |
| 2004/0199663 A1 | 10/2004 | Horvitz et al. | |
| 2004/0254998 A1 | 12/2004 | Horvitz | |
| 2015/0004945 A1 * | 1/2015 | Steeves | H04W 4/12 455/412.2 |

(Continued)

FOREIGN PATENT DOCUMENTS

WO    2015/184359 A2    12/2015

OTHER PUBLICATIONS

Fogarty, James, et al. "Predicting human interruptibility with sensors." ACM Transactions on Computer-Human Interaction (TOCHI) vol. 12, No. 1 (Mar. 2005), pp. 119-146.

(Continued)

*Primary Examiner* — Temica M Beamer
(74) *Attorney, Agent, or Firm* — Maschoff Brennan

(57) ABSTRACT

A method of smart notification scheduling and modality selection includes identifying a notification. The method includes extracting context pertaining to the notification or a user of the client device in response to receiving the notification. The method further includes determining a priority for the notification based on the context. The method also includes determining a delivery schedule for the notification based on the priority. The method includes determining a notification delivery plan based on at least one of the context, priority or delivery schedule. The method further includes transmitting the notification to a display device.

17 Claims, 6 Drawing Sheets

(56) References Cited

U.S. PATENT DOCUMENTS

2016/0037482 A1* 2/2016 Higgins .............. H04W 68/005
 455/414.1
2017/0099592 A1* 4/2017 Loeb .................... H04W 4/206

OTHER PUBLICATIONS

Pejovic, Veljko, and Mirco Musolesi. "Interruptme: designing intelligent prompting mechanisms for pervasive applications." Proceedings of the 2014 ACM International Joint Conference on Pervasive and Ubiquitous Computing. ACM, Sep. 13, 2014.
Okoshi, Tadashi, et al. "Attelia: Reducing user's cognitive load due to interruptive notifications on smart phones." Pervasive Computing and Communications (PerCom), 2015 IEEE International Conference, Mar. 23, 2015, pp. 96-104.
Lopez-Tovar, Hugo, Andreas Charalambous, and John Dowell. "Managing Smartphone Interruptions through Adaptive Modes and Modulation of Notifications." Proceedings of the 20th International Conference on Intelligent User Interfaces. ACM, Mar. 29, 2015, pp. 296-299.
Aberdeen, Douglas, Ondrej Pacovsky, and Andrew Slater. "The learning behind gmail priority inbox." LCCC: NIPS 2010 Workshop on Learning on Cores, Clusters and Clouds. 2010.
European Search Report issued in corresponding application No. 17 16 4691, dated Jun. 13, 2017.

* cited by examiner

SMART NOTIFICATION SCHEDULING AND MODALITY SELECTION

FIELD

The embodiments discussed herein are related to smart notification scheduling and modality selection.

BACKGROUND

In this information age, there is an overwhelming amount of information readily available and accessible partly due to the ability of individuals to disseminate information freely, quickly, and easily. Often, information may be delivered to a user's mobile device in near real-time as push notifications. Push notifications often may be used to inform users of various types of information, such as schedule, new email, or news, etc. In most instances, at least a portion of a push notification may be presented on a display of the user's mobile device.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of smart notification scheduling and modality selection includes identifying a notification. The method includes extracting context pertaining to the notification or a user of the client device in response to receiving the notification. The method further includes determining a priority for the notification based on the context. The method also includes determining a delivery schedule for the notification based on the priority. The method includes determining a notification delivery plan based on at least one of the context, priority or delivery schedule. The method further includes transmitting the notification to a display device.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
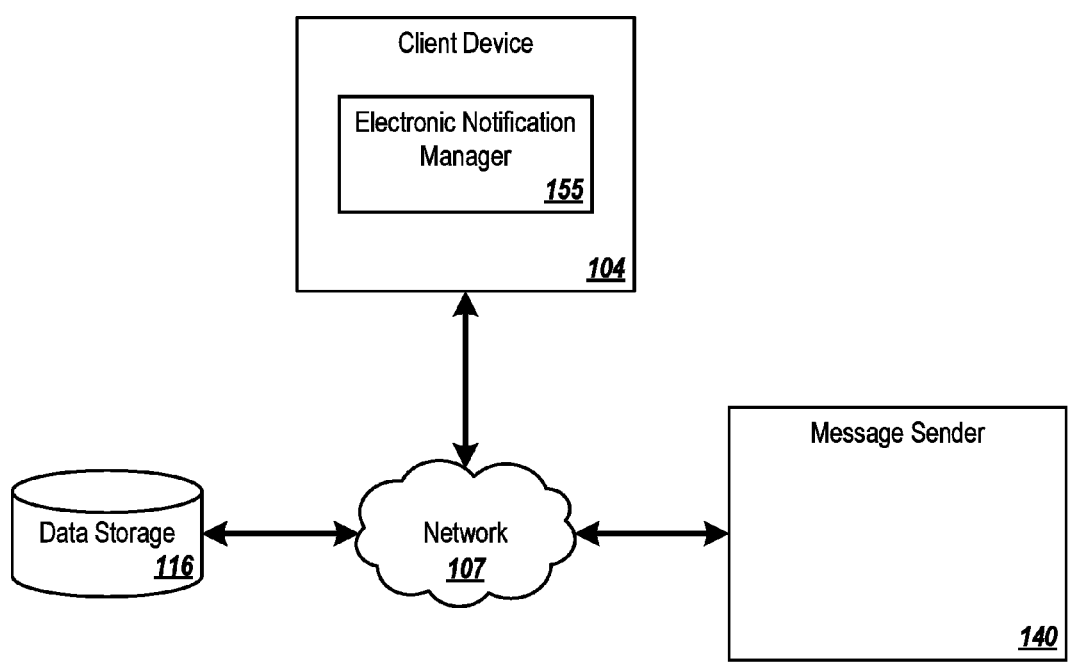
FIG. 1 illustrates a block diagram of an example operating environment of a smart notification system.

In this information age, there is an overwhelming amount of information readily available and accessible partly due to the ability of individuals to disseminate information freely, quickly, and easily. Often, digital information may be delivered to a user's mobile device in near real-time as a notification. Notifications often may be used to digitally inform users various types of information, such as an event, a meeting notice, a new email, or news, etc. In most instances, at least a portion of a notification may be presented on a display of the user's mobile device. In some instances, the notification may be presented as an overlay in front of content that is being presented on the display. In other examples, the notification may be displayed on a lock screen. Further, the notification may trigger a powered-off display to power on and present the notification on screen without any interaction or input from a user of the device.

Electronic notifications may sometimes include personal information, which may include sensitive information that a user may not want to appear in some situations. Further, in some situations, users may not wish to be interrupted by some or all electronics notifications. Notifications on computer systems (including mobile devices) are necessary but may have negative effects on productivity because notifications may be obtrusive or disruptive and may cause stress or grief to a user. In an attempt to address this problem created by technology, one prior approach includes rule-based notification, which may be use sorting, classifying into groups and interruption rules. Other approaches may include different notification styles (e.g., none, banner, alerts). Yet another prior approach may detect interruptibility of a user to detect whether a user may be busy based on their current activity, location, schedule, etc. These approaches, however, fall short of providing notifications to users because they do not detect an emotional state of a person (e.g., attention, relaxation, etc.) and also do not consider a priority of the notifications (or associated messages).

Aspects of the present disclosure address these and other shortcomings of existing notification systems by providing a system-wide notification management system that may reduce user disruption by rescheduling notifications at opportune time and using personalized modality. The system described herein may manage all notifications on an operating system, may estimate message importance and urgency, may detect a user's notification opportunities, may learn user's preferred notification methods for a given context, and may present notifications sorted by priority or grouped by content.

As will be explained in more detail below, a smart notification system may include a client device and a notification sender. When the notification sender transmits a notification to the client device, the client device may reduce user disruptions by identifying an opportune time for interruption, delaying unnecessary (e.g., low-priority) interruptions, selecting personalized notification modalities and presenting notifications by priority (e.g., importance and urgency).

Some additional details of these and other embodiments are discussed with respect to the appended figures in which commonly labeled items indicate similar structures unless described otherwise. The drawings are diagrammatic and schematic representations of some embodiments, and are not meant to be limiting, nor are they necessarily drawn to scale. Throughout the drawings, like numbers generally reference like structures unless described otherwise.

FIG. 1 illustrates a block diagram of an example operating environment 100 of a smart notification system, arranged in accordance with at least one embodiment described herein. The operating environment 100 includes a client device 104, a data storage 116, a message sender 140, and a network 107. The client device 104, the data storage 116, the message sender 140 (collectively, "environment components") may be communicatively coupled via the network 107. The environment components may communicate data and information, such as notifications communicated from the message sender 140 to the client device 104 via the network 107. Each of the environment components are briefly described in the following paragraphs.

The client device 104 may include a processor-based computing system. The client device 104 may include memory, a processor, and network communication capabilities. In the operating environment 100, the client device 104 may be capable of communicating and receiving data and information to and from the message sender 140 via the network 107. Some examples of the client device 104 may include a mobile phone, a smartphone, a tablet computer, a laptop computer, a desktop computer, a set-top box, a virtual-reality device, or a connected device, etc. The client device 104 may include one or more sensors to detect context pertaining to the user of the client device 104, an environment in which the client device 104 is located, etc. For example, the context may include a location of the user (e.g., home, office, car, outside), a type of message received (e.g., text message, email, calendar event, social networking message), brain activeness of the user (e.g., attention—high, relaxation—low), etc. The one or more sensors may include at least one of a clock, camera, microphone, gyrometer, accelerometer, infrared sensor, global positioning system (GPS), near-field communication (NFC) sensor, or fingerprint sensor, desktop usage sensor, pedometer, a heart rate monitor, brain activity sensor, light sensor, temperature sensor, or any other sensor.

The network 107 may include a wired network, a wireless network, or any combination thereof. The network 107 may include any suitable configuration or configurations including a star configuration, token ring configuration, or other configurations. The network 107 may include a local area network (LAN), a wide area network (WAN) (e.g., the Internet), and/or other interconnected data paths across which multiple devices may communicate. In some embodiments, the network 107 may include a peer-to-peer network. The network 107 may also be coupled to or include portions of a telecommunications network that may enable communication of data in a variety of different communication protocols. In some embodiments, the network 107 includes BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, or the like.

The data storage 116 may include any memory or data storage. The data storage 116 may include data pertaining to one or more of context data, notification priority data, a notification queue, modality data, etc., as further described in conjunction with FIG. 2. The data storage 116 may include network communication capabilities such that the environment components may communicate with the data storage 116. In some embodiments, the data storage 116 may include computer-readable storage media for carrying or having computer-executable instructions or data structures stored thereon. The computer-readable storage media may include any available media that may be accessed by a general-purpose or special-purpose computer, such as a processor. For example, the data storage 116 may include computer-readable storage media that may be tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may be included in the data storage 116.

In the depicted embodiment, the data storage 116 is separate from the client device 104. In some embodiments, the data storage 116 may be included in the client device 104 or the client device 104 may include a local data storage similar to the data storage 116 and may access the data storage 116 via the network 107. In at least one embodiment, the data storage 116 may include multiple data storages.

The message sender 140 may include a processor-based computing device. For example, the message sender 140 may include a hardware server or another processor-based computing device configured to function as a server. The message sender 140 may include memory and network communication capabilities. In the operating environment 100, the message sender 140 may be configured to communicate with the client device 104, and the data storage 116 via the network 107.

The message sender 140 may transmit a message to the client device 104. The message may include any type of message, such as an email, text message, calendar event, social networking message, weather message, or any other type of message. In at least one embodiment, the message sender 140 may generate and deliver a notification to the client device 104 without a specific request from the client device 104. Such a notification may be referred to as a push notification. For example, an application (such as an email application) may receive a message (e.g., an email) and may generate a notification of the email. The notification, for example, may include at least some of the email, such as the subject and the first few words of the email. The application may send the notification to the client device 104 via the message sender 140. In at least one embodiment, the application is part of the message sender 140.

The client device 104 may include an electronic notification manager 155. The electronic notification manager 155 may generate a notification in response to an event, such as receiving a message from the message sender 140. The event may include any event for any application or service. For example, the event may include receipt of an email from the message sender 140, a text message, a completion of a download, an event in an electronic game, etc.

The electronic notification manager 155 may determine what information to provide in an electronic notification, when to provide the electronic notification, and how to provide the electronic notification. In at least one embodiment, the client device 104 may receive the notification (e.g., a push notification) from the message sender 140 or from a local application. In response to receiving a message or a notification, the electronic notification manager 155 may extract context from the message or notification. To extract context, the electronic notification manager 155 may identify and classify content of the message or notification and determine what information to provide in the notification. The electronic notification manager 155 may determine a priority for the message or notification. To determine the priority, the electronic notification manager 155 estimates an importance level (e.g., high importance, medium importance, low importance) and an urgency level (e.g., high urgency, medium urgency, low urgency) for the message or notification. The electronic notification manager 155 may schedule delivery of the message or notification. In scheduling the delivery, the notification manager 155 may determine an interruptibility score based on user activities (e.g., user attention level, user activeness). The electronic notification manager 155 may determine how to provide the notification (e.g., modality), such as in a categorized list, a list sorted by priority, sound, vibration, or any combination thereof, with personalized information, etc. An example embodiment of smart notification scheduling and modality selection is further described with respect to FIG. 2.

The electronic notification manager 155 may be implemented using hardware including a processor, a microprocessor (e.g., to perform or control performance of one or more operations), an FPGA, or an ASIC. In some other instances, the electronic notification manager 155 may be implemented using a combination of hardware and software. Implementation in software may include rapid activation and deactivation of one or more transistors or transistor elements such as may be included in hardware of a computing system (e.g., the client device 104). Additionally, software defined instructions may operate on information within transistor elements. Implementation of software instructions may at least temporarily reconfigure electronic pathways and transform computing hardware.

In at least one embodiment, an electronic notification may at least partially originate from an application on the client device 104. For example, such an application may include an electronic game application. When a certain level of progress is made in the game, for example, the electronic game application may generate a push notification. For example, a user may initiate construction of a digital building within the electronic game application that completes after a predetermined period of time has elapsed. The user may exit the electronic game application before the period of time has elapsed. The electronic game application may generate a push notification to indicate to the user that the construction of the building has completed.

Modifications, additions, or omissions may be made to the operating environment 100 without departing from the scope of the present disclosure. Specifically, the operating environment may include one or more client devices 104, one or more message senders 140, one or more data storages 116, or any combination thereof. For example, the operating environment 100 may include another system with which the client device 104 interacts based on an authentication message received from the message sender 140.

Moreover, the separation of various components in the embodiments described herein is not meant to indicate that the separation occurs in all embodiments. It may be understood with the benefit of this disclosure that the described environment components may be integrated together in a single component or separated into multiple components.

Figure 2:
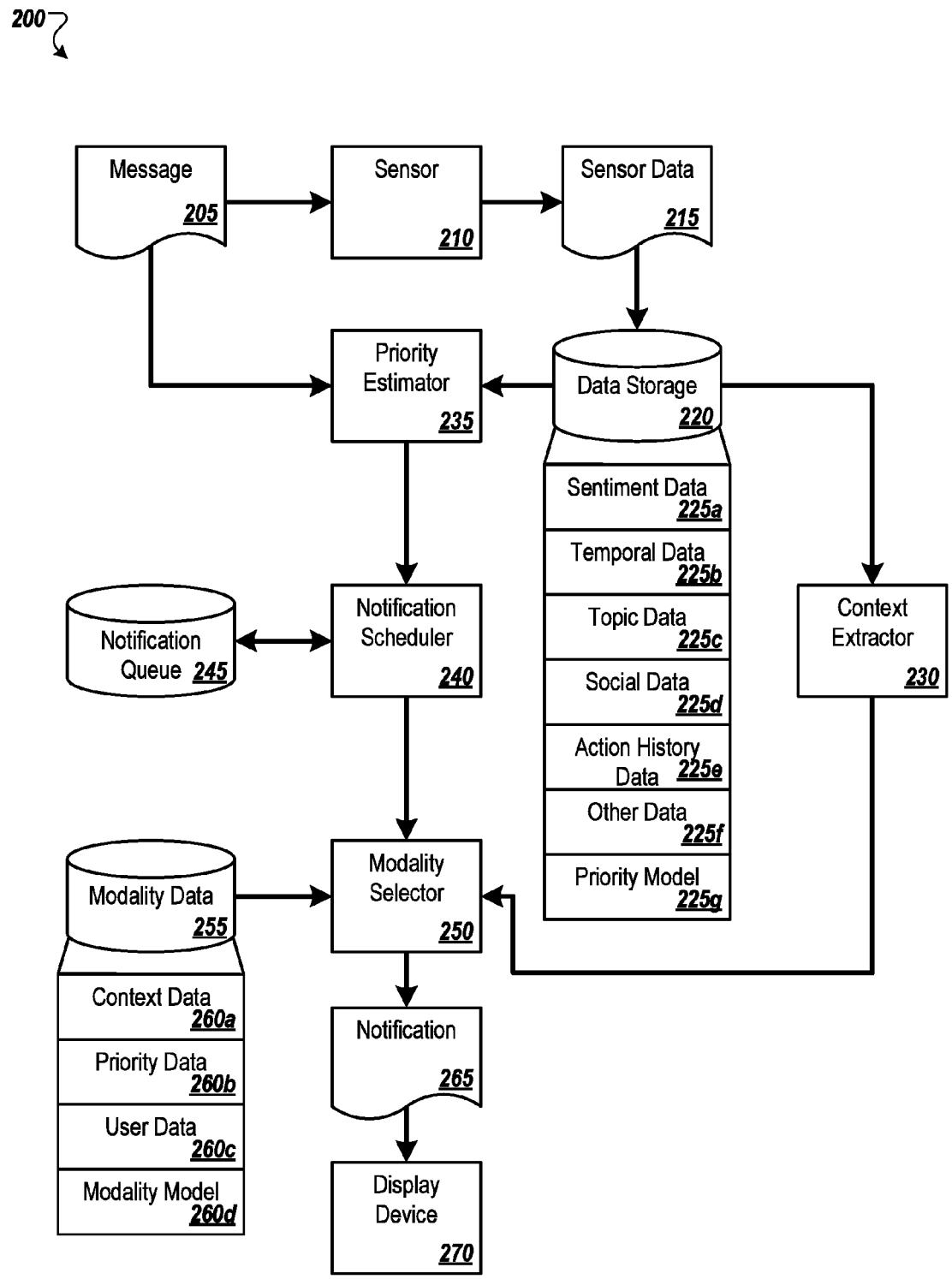
FIG. 2 illustrates a block diagram of an example smart notification scheduling and modality selection system.

FIG. 2 illustrates a block diagram of an example smart notification scheduling and modality selection system 200 (hereafter "system 200"), arranged in accordance with at least one embodiment described herein. The system 200 may be implemented as a component of a processor-based computing device. For example, the system 200 may be a component of a mobile phone, a smartphone, a tablet computer, a laptop computer, a desktop computer, a set-top box, a wearable smart device (e.g., a smartwatch, smart glasses, a smart pedometer, or any other wearable smart device), or one or more servers. In at least one embodiment, one or more of the components of system 200 may be implemented in a client device (such as the client device 104 of FIG. 1) or in a server device (such as the message sender 140 of FIG. 1).

System 200 may receive a message 205. The message 205 may include a notification of a message. The system 200 may include a sensor 210 to identify various data that may relate to the message 205. Further, the sensor 210 may be configured to measure various data pertaining to a user. All data measured or collected by the sensor 210 may be referred to as sensor data 215. The sensor data 215 may be stored in a data storage, such as data storage 220. In some embodiments, the sensor 210 may be configured to access electronic data associated with the user (such as a message 205) or the environment of the user. For example, the sensor 210 may be configured to measure data, such as a biological state of the user, an environmental state of the user, a mental state of the user, histories of those states, and a history of user receptiveness to past notifications. The sensor 210 may include at least one of a clock, camera, microphone, gyrometer, accelerometer, infrared sensor, global positioning system (GPS), near-field communication (NFC) sensor, or fingerprint sensor, desktop usage sensor, pedometer, a heart rate monitor, brain activity sensor, light sensor, temperature sensor, or any other sensor.

In another example, the message may include an email, a calendar event, a social message, or weather data. The sensor 210 may be configured to use the message 205 to identify calendar data describing the user's electronic calendar, social data describing the user's activities on a social network, or weather data describing current and/or forecasted weather for a geographic location in which the user is currently located or may later be located. The calendar data identified by the sensor 210 may include a description of the user's appointments, due dates, assignments, etc. For example, the calendar data may be associated with the user's e-mail account and may describe the user's appointments at work for a specific time or a range of time.

Sensor data 215 that includes a measured or calculated sentiment of the user may be stored as sentiment data 225*a*. Sensor data 215 that includes a measured or calculated temporal expression of the user may be stored as temporal data 225*b*. The temporal expression data may include, for example, date and time information, such as "2 PM Friday." Sensor data 215 that pertains to a topic or may provide context may be stored as topic data 225*c*. The topic data 225*c* may include short phrases summarizing the content of the messages, such as "meeting", "deadline", "report", etc. Social data 225*d* identified by the sensor 210 may describe the user's comments, approval indications, posts, or status updates on a social network. Social data 225*d* may also include conversations and interactions with other users via communication channels such as email. For example, the user may have a larger amount of email conversations with a contact than with other contacts within the same period of time, which indicate that messages from that contact may have higher importance for the user. In some embodiments, the social data may be stored in a social graph accessible by the system 200.

Action history data 225e may include data describing the historical conditions under which the user 106 acted on an electronic notification. Acting on an electronic notification may include following the directives of the electronic notification. Acting on the electronic notification may include the user engaging in a period of action or inaction based on the electronic notification provided to the user. For example, the action may include reading or responding to an email, accepting or rejecting a calendar invitation, In another example, if the user is provided with an electronic notification specifying that the user should take a ten-minute walk outside, then acting on the adaptive interruption may include the user taking a walk outside for ten minutes as specified by the electronic notification. Acting on the electronic notification may also be defined as the user carrying out some degree of a recommended action. For example, in this case, the user may have acted on the electronic notification if they simply walked for any period of time, or if they walked for at least 50% of the suggested time, etc. The extent to which a user acts on an electronic notification can also be recorded as action history data 225e.

Other data 225f may include any data that may be used by the smart notification scheduling and modality selection system 200 for delivery of a notification to a user. In at least one embodiment, the other data 225f may include weather data. The weather data retrieved by the sensor 210 may describe weather conditions associated with a geographic location of the user. For example, the weather data may indicate that the weather associated with the user's geographic location is 80 degrees Fahrenheit and suitable for the user to take a walk outside or engage in some other outdoor activity. Weather data may be useful when determining when or how to provide a notification to the user. For example, the notification may be associated with a fitness application and may be an encouragement for the user to achieve a daily outdoor running goal. When the weather data indicates that it is currently pouring rain outside, for example, such weather data may be beneficial in determining when and how to provide the notification (e.g., delayed until after the rain stops). The other data 225f may also include manual input received from the user or from a system administrator. For example, the user may provide manual input to indicate that messages from a particular source or other user are highly important and should be delivered immediately regardless of other circumstances. The other data 225f may also include a whitelist or a blacklist for message types, message sources, etc.

The system 200 may include a context extractor 230. The context extractor 230 may have access to one or more of the sentiment data 225a, temporal data 225b, topic data 225c, social data 225d, action history data 225e, and the other data 225f, such as via access to the data storage 220. The context extractor 230 may analyze any of the sensor data 225 to identify a context of the message 205. The context may include information of the user and the environment of the user. For example, the context may indicate that the user is in their office, in front of a computer, and in a focused state. In another example, the context may indicate that the user is out of the office, walking, and in a relaxed state. The context may also indicate a type of message, such as an email, a meeting invitation, etc.

The system 200 may include a priority estimator 235 that may determine a priority for the message 205. The priority of the message 205 may indicate an importance level and an urgency level. The importance level may be based on a binary scale or may have any number of levels indicating different importance levels. Similarly, urgency level may be based on a binary scale or may have any number of levels indicating different urgency levels. The determined priority may be based on a priority model 225g. The priority estimator 235 may create and update the priority model 225g. The priority model 225g may be based on the sensor data 215. For example, the priority model 225g may be based on one or more of the sentiment data 225a, temporal data 225b, topic data 225c, social data 225d, action history data 225e, and the other data 225f. In an example, the priority estimator 235 may identify a message 205 with the following content: "Hi all. Please provide me the February monthly report by 23th Wednesday. I think this time is John's turn. Thanks." Based at least in part on the content of the message 205, the one or more sensors 210 may determine sentiment data 225a (e.g., anger=0.05, disgust=0.3, fear=0.33, joy=0.08, sadness=0.13), temporal data 225b (e.g., $23^{rd}$ Wednesday), topic data 225c (e.g., business and industrial, company, monthly report), social data 225d (e.g., 20 emails from this contact within the past week), action history data 225e (e.g., average response time for this contact=1 minute, actions for messages from this contact are: read (100%), reply (95%), forward (10%)), and other data 225f (e.g., an option for the user to manually input the message 205 as important and/or urgent). Based on an analysis of these example sensor data in view of the priority model 225g, the priority estimator 235 may determine that the message 205 has a priority of high importance and high urgency.

In at least one embodiment, the priority may be based on a value of the message (e.g., importance, urgency) and a cost of the interruption at the particular moment (e.g., a level of distraction). The level of distraction may be quantified by an interruptibility score. The interruptibility score may indicate whether the notification may be viewed negatively by the user if delivered immediately as compared to a later delivery. In at least one embodiment, a high interruptibility score may indicate that the cost of the interruption at the particular moment may be high and a low interruptibility score may indicate that the cost of the interruption at the particular moment may be low. Alternatively, a high interruptibility score may indicate that the cost of the interruption at the particular moment may be small and a low interruptibility score may indicate that the cost of the interruption at the particular moment may be large.

When attempting to interrupt the user with the notification, the priority estimator 235 may evaluate the importance, urgency, and interruptibility score. To determine the interruptibility score, the priority estimator 235 may use one or more sensors (e.g., video camera, location, acceleration) to detect interruptibility. For example, when a GPS sensor indicates that the user is in a meeting room at a place of business, the interruptibility score may reflect that the cost of the interruption at the particular moment may be high. The priority estimator 235 may also use one or more sensors to determine an emotional state of the user (e.g., attention, relaxation), such as by performing a facial analysis, heart rate analysis, breathing analysis, brain wave scan, etc.

The system 200 may include a notification scheduler 240. The notification scheduler 240 may determine when to transmit a notification to the display device 270. The notification scheduler 240 may schedule notification delivery based at least in part on the notification priority as determined by the priority estimator 235. The notification scheduler 240 may use the determined priority in view of a set of rules to schedule notification delivery. For example, a set of rules may be as follows:

| Interruptibility Score | Importance | Urgency | Action |
|---|---|---|---|
| High | High | High | Immediate delivery |
| High | High | Low | Immediate delivery |
| High | Low | High | Immediate delivery |
| High | Low | Low | Delay delivery |
| Low | High | High | Immediate delivery |
| Low | High | Low | Delay delivery |
| Low | Low | High | Delay delivery |
| Low | Low | Low | Delay delivery |

The notification scheduler 240 may schedule notification delivery based on the "Action" in the above table. "High" may be defined as higher than a threshold (e.g., >0.5 on a scale of 0 to 1). "Low" may be defined as below than a threshold (e.g., ≤0.5 on a scale of 0 to 1). Other scales may be used, such as a "High," "Medium," and "Low" scale, a numerical scale, or any other scale. Once a delivery schedule has been determined for the notification, the notification scheduler 240 may transmit the notification in a notification queue 245. Notifications may be sent to the display device 270 from the notification queue 245. In at least one embodiment, the notification queue 245 may only store an order in which to transmit notifications to the display device 270 and notifications may not be stored in the notification queue 245.

The system 200 may also include a modality selector 250. The modality selector 250 may use a modality data 255 to determine a mode for notification delivery. When the message 205 includes a notification (e.g., notification 265), the modality selector 250 may transmit the notification 265 for display on the display device 270 based on a notification delivery plan. When the message 205 does not include a notification, the modality selector 250 may generate notification 265 based on the message 205.

In at least one embodiment, the modality selector 250 may generate a modality model 260d for notifications. In at least one embodiment, the modality selector 250 may learn what the user did under a given context for a given message and may use such learning to generate the modality model 260d to be used for future notifications in a future context. When generating the modality model 260d, the modality selector 250 may use the context 260a, priority data 260b and user data 260c. The context 260a may include the context determined by the context extractor 230. The priority data 260b may include the context determined by the priority estimator 235. The user data 260c may include actions taken by the user in response to previous notifications. Such user actions may be determined by the sensor 210.

In an example of how the modality selector 250 may generate the modality model 260d, the context may indicate that a location includes an office, the message 205 includes a calendar event for a meeting, and a brain activeness of attention high, relaxation low. With this context, the user may have taken the actions: turned mute on, vibration on the client device. Under these circumstances, for example, the modality selector 250 may learn a modality rule that when the user is in a meeting in the office, the client device may have the mute on and vibration on. When a notification with a high importance and low urgency arrived, the user took an action of "Reading the message, but not responding". The modality selector 250 may also infer a scheduling rule of "delay notification when interruptibility is low, importance is high, and urgency is low."

Based on the modality model 260d, the modality selector 250 may determine a notification delivery plan for the notification 265. Examples of various delivery plans are described below.

A first notification delivery plan may be as follows:

Application: Email
From: boss@company.com
Subject: February Monthly TPS report
Content: Hi all. Please provide me the February monthly report by 23$^{rd}$ Wednesday. I think this time is John's turn. Thanks.
Context: In office, in front of computer, focused
Priority: High importance, high urgency
Schedule: Immediately
Modality: Visual, sound, vibration A second notification delivery plan may be as follows:

Application: Email
From: boss@company.com
Subject: Likely Date for Event
Content: Jane just announced that Event is likely to be on 6/1. Please keep that date clear on your schedule.
Context: In office, in front of computer, focused
Priority: High importance, low urgency
Schedule: Within two hours
Modality: Visual, sound, vibration A third notification delivery plan may be as follows:

Application: Email
From: promotions@retailer.com
Subject: Last day to save an extra 20% PLUS free shipping!
Content: [Sale content]
Context: In office, in front of computer, focused
Priority: Low importance, low urgency
Schedule: Within two hours
Modality: Visual A fourth notification delivery plan may be as follows:

Application: Email
From: colleague@email.com
Subject: RE: Here are the slides you wanted
Content: Thank you.
Context: Out of office, walking, relaxed
Priority: Low importance, low urgency
Schedule: Within two hours
Modality: Visual A fifth notification delivery plan may be as follows:

Application: Game
From: Game
Subject: Building complete
Content: Building complete
Context: In office, relaxed
Priority: Low importance, low urgency
Schedule: After user leaves the office (based on geofence)
Modality: Visual The modality selector 250 may transmit the notification 265 to the display device 270 based on the notification delivery plan for the notification 265. In at least one embodiment, the modality selector 250 and the display device 270 are associated with the same client device (e.g., client device 104 of FIG. 1). In at least one embodiment, the modality selector 250 transmits the notification 265 to the display device 270 via a network (e.g., network 107 of FIG. 1). The display device 270 may include a display, monitor, or screen used to display graphical data describing an adaptive interruption that is personalized for the user. For example, the display device 270 may include a computer monitor that is communicatively coupled to a desktop computer or set-top box that stores and executes some or all of the components of the system 200. In some embodiments, the display device 270 may include a screen of a mobile phone, a smartphone, a tablet computer, a laptop computer, or a wearable smart device (e.g., a smartwatch, smart glasses, a smart pedometer, or any other wearable smart device). In some embodiments, the display device 270 may be a speaker or some other hardware used to reproduce an audio signal. The display device 270 may also include a vibration device that produces vibrations.

In some embodiments, some or all of the components of system 200 may be implemented using hardware including a field-programmable gate array (FPGA) or an application-specific integrated circuit (ASIC). In some other instances, the some or all of the components of system 200 may be implemented using a combination of hardware and software. Thus, the some or all of the components of system 200 may be implemented as one or more hardware devices.

Figure 3:
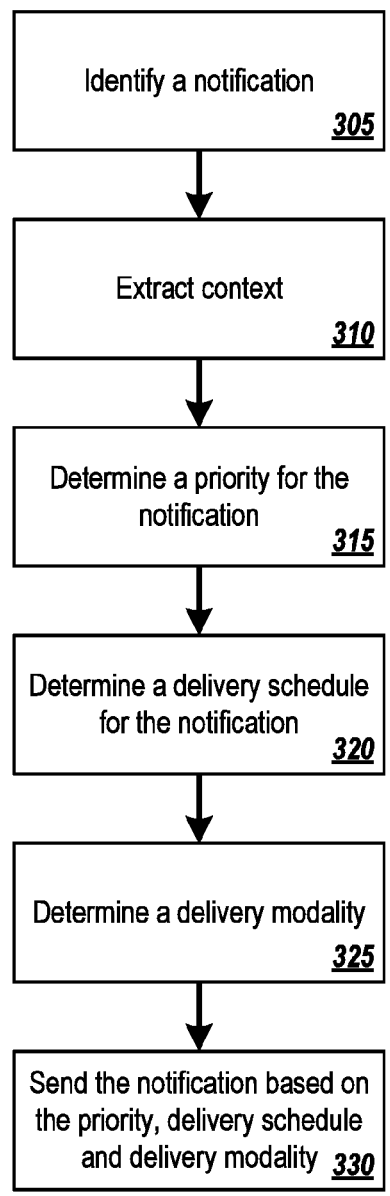
FIG. 3 illustrates a flow diagram of an example method of smart notification scheduling and modality selection.
Figure 4:
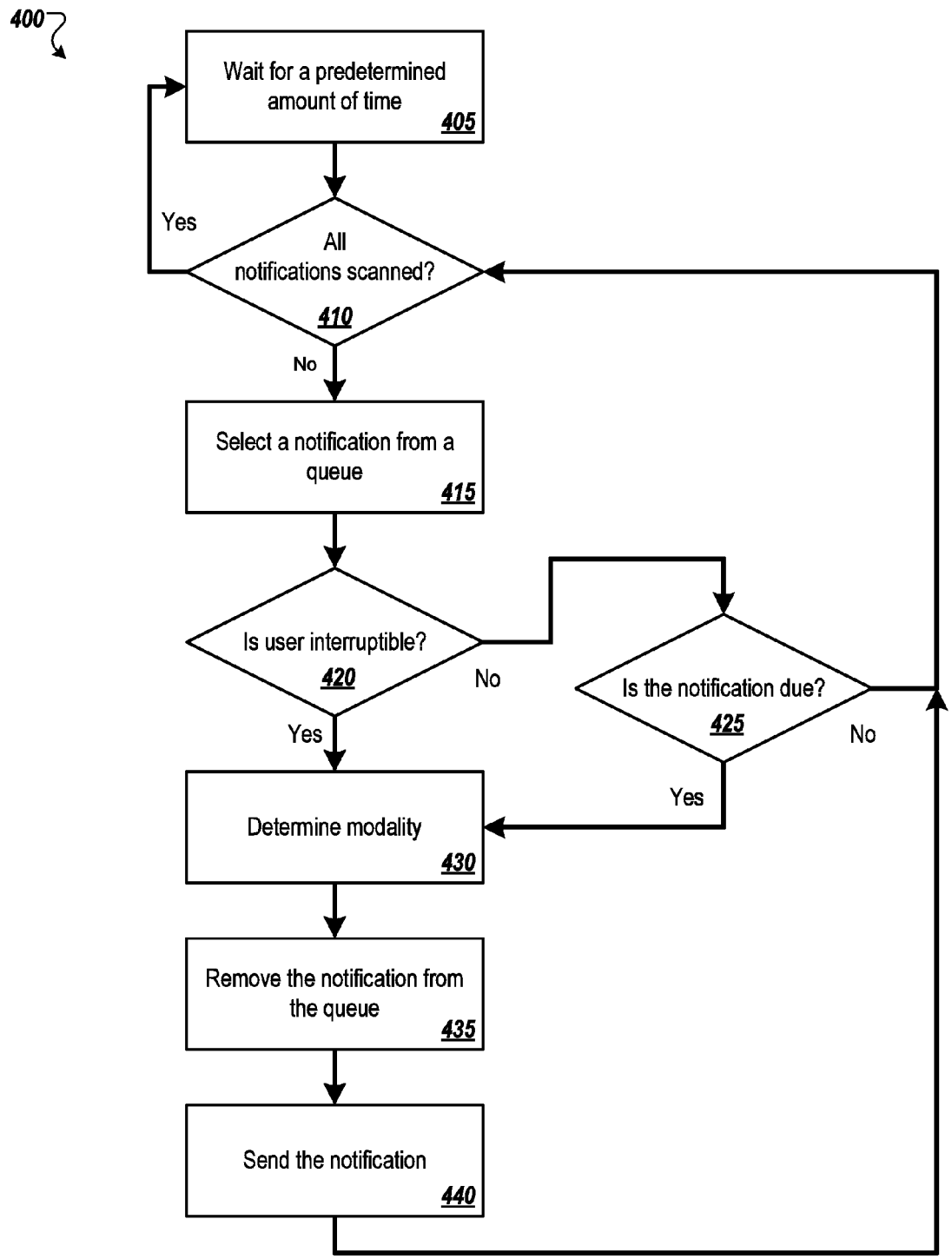
FIG. 4 illustrates a flow diagram of an example method of notification delivery.

FIGS. 3-4 illustrate flow diagrams of example methods related to smart notification scheduling and modality selection. The methods may be performed by processing logic that may include hardware (circuitry, dedicated logic, etc.), software (such as is run on a general purpose computer system or a dedicated machine), or a combination of both, which processing logic may be included in the operating environment 100 of FIG. 1, or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 3 illustrates a flow diagram of an example method 300 of smart notification scheduling and modality selection. The method 300 may be performed, at least in part, by processing logic in a client device, such as the client device 104 of FIG. 1. The method 300 may begin at block 305, where the processing logic may identify a notification associated with an application. The application may operate and be executed by the processing logic or by other processing logic on the same client device. In at least one embodiment, the application may be a server-based notification and the processing logic may receive the notification via a network.

At block 310, the processing logic may extract context pertaining to the notification or a user of the client device in response to receiving the notification. To extract context, the processing logic may identify and classify content of the message or notification and determine what information to provide in the notification, as further described with respect to FIGS. 1 and 2. In at least one embodiment, the when extracting context, the processing logic may receive data via a sensor. The data may include data pertaining to the user of the client device or data of an environment in which the client device is located. The processing logic may also determine the context based on at least one of the data pertaining to the user of the client device or the data of an environment in which the client device is located. In at least one embodiment, the processing logic may function as the context extractor 230 of FIG. 2.

At block 315, the processing logic may determine a priority for the notification based on the context. Determining the priority for the notification based on the context may include estimating an importance level and an urgency level for the notification based on the context and determining the priority based on the importance level and the urgency level. In at least one embodiment, determining the priority for the notification based on the context further may include determining an interruptibility score. The interruptibility score may indicate a cost of the interruption. The priority may be determined based on the importance level, the urgency level, and the interruptibility score. In at least one embodiment, the processing logic may function as the priority estimator 235 of FIG. 2.

At block 320, the processing logic may determine a delivery schedule for the notification based on the priority. The delivery schedule may be determined based on at least one of the importance level, the urgency level, and the interruptibility score. In at least one embodiment, determining the delivery schedule for the notification based on the priority may include determining an immediate delivery schedule for the notification when the importance level, the urgency level, and the interruptibility score meet respective threshold criteria (e.g., each are above or below a respective threshold level). For example, importance level may be above an importance threshold, the urgency level may be above an urgency threshold, and the interruptibility score may be above an interruptibility threshold. In at least one embodiment, determining the delivery schedule for the notification based on the priority may include determining a delayed delivery schedule for the notification when at least one of the importance level, the urgency level, and the interruptibility score are below a respective threshold level. For example, one or more of the importance level may be below the importance threshold, the urgency level may be below the urgency threshold, and the interruptibility score may be below the interruptibility threshold. In at least one embodiment, the processing logic may function as the notification scheduler 240 of FIG. 2.

At block 325, the processing logic may determine a notification delivery plan based on at least one of the context, priority or delivery schedule. The notification delivery plan may include a delivery modality of at least one of a visual notification, a sound notification, or a vibration notification. In at least one embodiment, the processing logic may function as the modality selector 250 of FIG. 2.

At block 320, the processing logic may transmit the notification to a display device. In at least one embodiment, transmitting the notification to the display device may include transmitting the notification via a network. Alternatively, transmitting the notification to the display device may include transmitting the notification via a system bus.

FIG. 4 illustrates a flow diagram of an example method 400 of notification delivery. The method 400 may be performed in an operating environment such as the operating environment 100 of FIG. 1. The method 400 may be performed, at least in part, by processing logic in a client device, such as the client device 104 of FIG. 1. The client device 104 may include or may be communicatively coupled to a non-transitory computer-readable medium having stored thereon or encoded therein programming code or instructions that are executable by a processor to perform or cause performance of the method 400. Additionally or alternatively, the client device 104 may include a processor that is configured to execute computer instructions to perform or control performance of the method 400. Although illustrated as discrete blocks, various blocks may be divided into additional blocks, combined into fewer blocks, or eliminated, depending on the desired implementation.

The method 400 may begin at block 405, where the processing logic may wait for a predetermined amount of time. The predetermined amount of time may be any amount of time. In at least one embodiment, the predetermined amount of time may be zero for first time that block 405 is executed.

At block 410, the processing logic may determine whether other notifications (e.g., such as notifications in a notification queue) have been scanned. The processing logic may scan the notification for context, as described. When all notifications have been scanned ("YES" at block 410), the processing logic may proceed to block 405 to wait for the predetermined amount of time.

When all notifications have not been scanned ("NO" at block 410), at block 415 the processing logic may select a notification, such as by selecting a notification in the notification queue. The processing logic may scan the notification (or a message associated with the notification). The processing logic may also identify user or environmental data, as described.

At block 420, the processing logic may determine whether a user is interruptible. For example, the processing logic may determine that the user is in a meeting and thus, the user may not be interruptible. Alternatively, the processing logic may determine that the user may be engaged in an activity that may be interruptible (e.g., when the user is not engaged in anything of substantial importance). When the processing logic determines that the user is interruptible ("YES" at block 420), the processing logic may proceed to block 430.

When the processing logic determines that the user is not interruptible ("NO" at block 420), at block 425 the processing logic may determine whether the notification is due. Determining whether the notification is due may include comparing the scheduled delivery time with current time, where the scheduled delivery time may be specific to a particular notification, application, user, sender, etc. For example, when a first notification is associated with a first message from a first user, the time may be shorter than for a second notification is associated with a second message from a second user. When the processing logic determines that the notification is not due ("NO" at block 425), the processing logic may proceed to block 410. When the processing logic determines that the notification is due ("YES" at block 425), the processing logic may proceed to block 430.

At block 430, the processing logic may determine a modality for the notification, as described (e.g., with respect to block 325 of FIG. 3). At block 435, the processing logic may remove the notification from the queue. At block 440, the processing logic may transmit the notification to a display device. In at least one embodiment, the processing logic may transmit the notification to the display device as soon as the user becomes interruptible ("YES" at block 420) or when the notification is due ("YES" at block 425).

Figure 5:
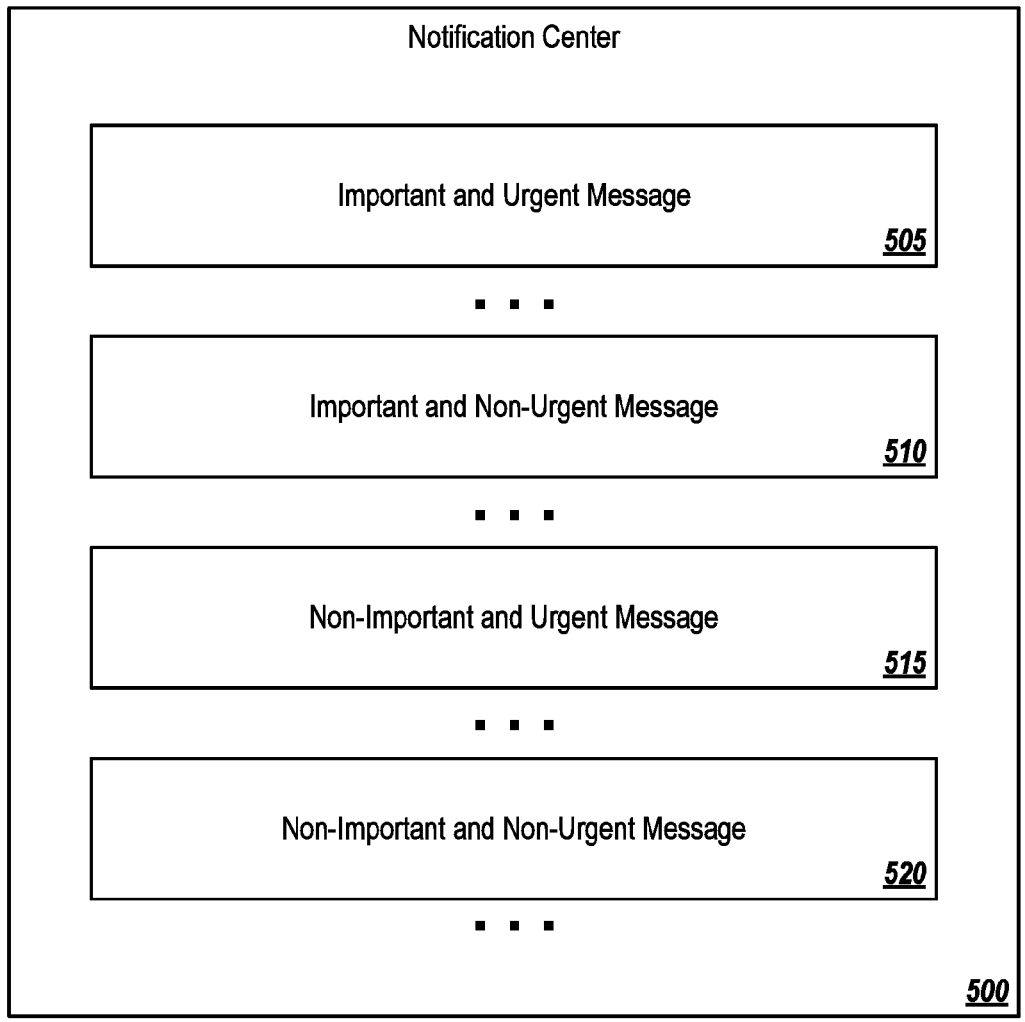
FIG. 5 illustrates a graphical user interface (GUI) of an example notification center.

FIG. 5 illustrates a graphical user interface (GUI) of an example notification center 500. The example GUI may be presented on a display of a client device. In some instances, the notification may be presented as an overlay in front of content that is being presented on the display. In other examples, the notification may be displayed on a lock screen. Further, the notification may trigger a powered-off display to power on and present the notification on screen without any interaction or input from a user of the device. In at least one embodiment, the example GUI may be presented within a web browser when the user accesses the internet-based content platform via the web browser. In another embodiment, the example GUIs may be an interface presented by a media viewer (e.g., an app, an application, a program, a software module/component, etc.). Some example GUIs include control elements in the form of a button (e.g., to perform an action). However, it should be noted that various other control elements can be used for selection by a user such as a check box, a link, or any other user interface elements.

As shown, the example notification center 500 may include one or more important and urgent notifications 505, one or more important and non-urgent notifications 510, one or more non-important and urgent notifications 515 and one or more non-important and non-urgent notifications 520. As illustrated, the notifications 505, 510, 515 and 520 are presented in a sorted order according to importance first and urgency second. In at least one embodiment, the notifications 505, 510, 515 and 520 may be presented in a sorted order according to importance second and urgency first. In at least one embodiment, the notifications 505, 510, 515 and 520 may be presented according to importance, urgency and interruptibility score. Also illustrated, the notifications 505, 510, 515 and 520 are presented in a descending order of priority, with the highest priority on top and the lowest priority on bottom. The notifications 505, 510, 515 and 520 may be presented in an ascending order of priority, with the lowest priority on top and the highest priority on bottom. In at least one embodiment, the notifications 505, 510, 515 and 520 may be presented according to another scheme instead or in addition to an ordered list. For example, the notifications 505, 510, 515 and 520 may be presented according to color, shape, size, font size, or any other type of technique to distinguish between notifications of different priorities.

Figure 6:
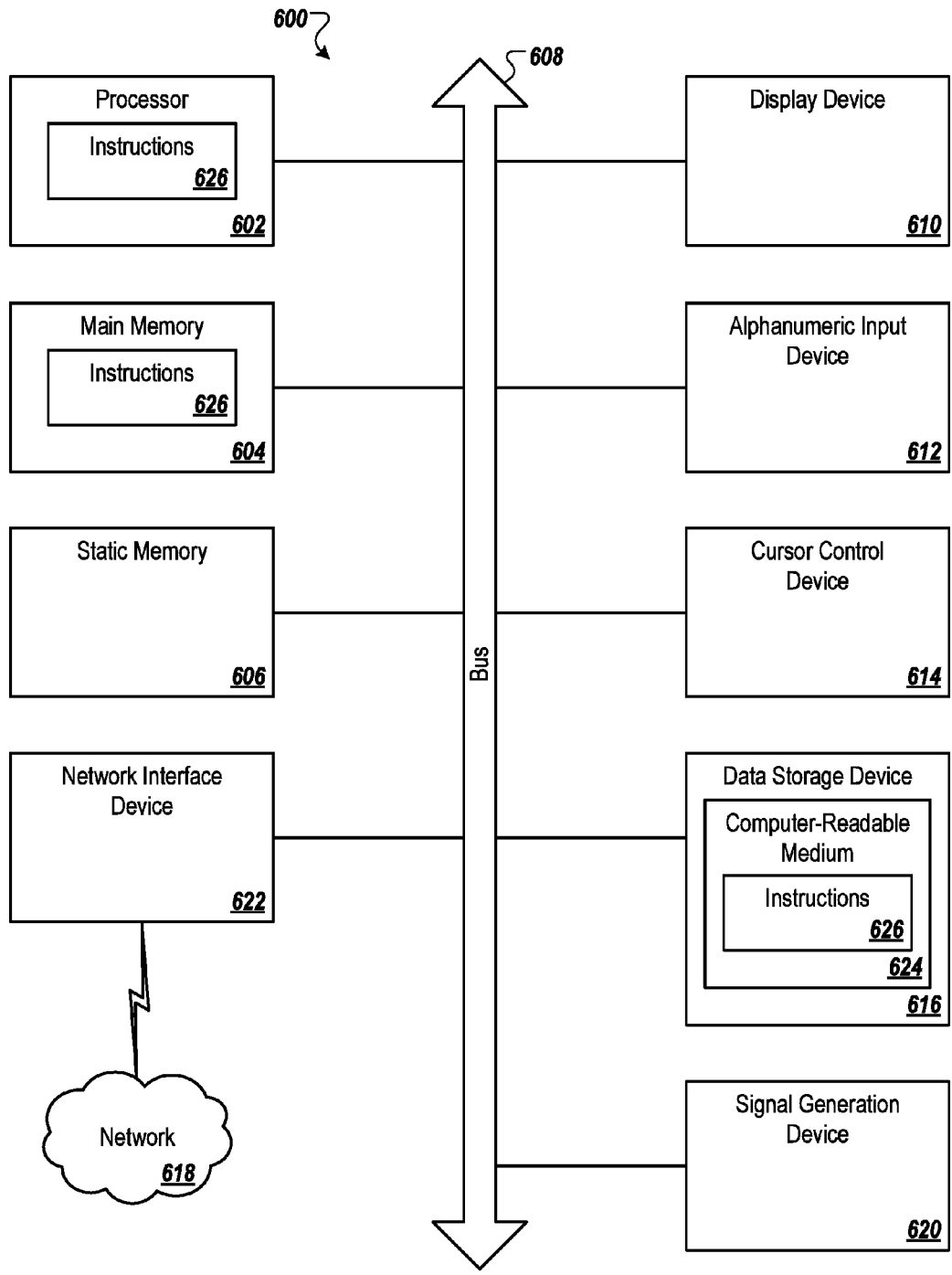
FIG. 6 illustrates a diagrammatic representation of a machine in the example form of a computing device within which a set of instructions, for causing the machine to perform any one or more of the methods discussed herein, may be executed, all arranged in accordance with at least one embodiment described herein.

FIG. 6 illustrates a diagrammatic representation of a machine in the example form of a computing device 600 within which a set of instructions, for causing the machine to perform any one or more of the methods discussed herein, may be executed. The computing device 600 may include a mobile phone, a smart phone, a netbook computer, a rack-mount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 600 includes a processing device (e.g., a processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)) and a data storage device 616, which communicate with each other via a bus 608.

Processing device 602 represents one or more general-purpose processing devices such as a microprocessor, central processing unit, or the like. More particularly, the processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also include one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computing device 600 may further include a network interface device 622 which may communicate with a network 618. The computing device 600 also may include a display device 610 (e.g., a liquid crystal display (LCD) or a cathode ray tube (CRT)), an alphanumeric input device 612 (e.g., a keyboard), a cursor control device 614 (e.g., a mouse) and a signal generation device 620 (e.g., a speaker). In one implementation, the display device 610, the alphanumeric input device 612, and the cursor control device 614 may be combined into a single component or device (e.g., an LCD touch screen).

The data storage device 616 may include a computer-readable storage medium 624 on which is stored one or more sets of instructions 626 (e.g., operating environment 100 of FIG. 1) embodying any one or more of the methods or functions described herein. The instructions 626 may also reside, completely or at least partially, within the main memory 604 and/or within the processing device 602 during execution thereof by the computing device 600, the main memory 604 and the processing device 602 also constituting computer-readable media. The instructions may further be transmitted or received over a network 618 via the network interface device 622.

While the computer-readable storage medium 626 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Modifications, additions, or omissions may be made to any of the methods described without departing from the scope of the present disclosure. Specifically, any of the methods described may include more or fewer blocks. Further, the blocks in any of the methods described may be arranged in a different order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method, comprising:
    identifying, by a client device, a notification associated with an application;
    in response to identifying the notification, using a plurality of sensors to extract context data pertaining to the notification or a user of the client device;
    determining a priority for the notification based on the context data by:
        estimating an importance level and an urgency level for the notification based on the context data;
        determining an interruptibility score based on the context data; and
        determining the priority based on the importance level, the urgency level, and the interruptibility score;
    determining a delivery schedule for the notification based on the priority;
    determining a notification delivery plan based on at least one of the context data, priority or delivery schedule; and
    transmitting the notification to a display device.

2. The method of claim 1, wherein using the plurality of sensors to extract the context data pertaining to the notification or the user of the client device comprises:
    receiving data via at least one of the plurality of sensors, wherein the data comprises data pertaining to the user of the client device or data of an environment in which the client device is located, the method further comprising
    determining the context based on at least one of the data pertaining to the user of the client device or the data of the environment in which the client device is located.

3. The method of claim 1, wherein the interruptibility score may indicate a cost of interruption.

4. The method of claim 3, wherein the determining the delivery schedule for the notification based on the priority comprises determining an immediate delivery schedule for the notification when the importance level, the urgency level, and the interruptibility score each meet respective threshold criteria.

5. The method of claim 3, wherein the determining the delivery schedule for the notification based on the priority comprises determining a delayed delivery schedule for the notification when at least two of the importance level, the urgency level, and the interruptibility score each meet respective threshold criteria.

6. The method of claim 1, wherein the notification delivery plan includes a delivery modality of at least one of a visual notification, a sound notification, or a vibration notification.

7. A system, comprising;
    a memory; and
    a processor operatively coupled to the memory, the processor being configured to perform operations comprising:
        identifying a notification associated with an application;
        in response to identifying the notification, using a plurality of sensors to extract context data pertaining to the notification or a user of a client device;
        determining a priority for the notification based on the context data by:
            estimating an importance level and an urgency level for the notification based on the context data;
            determining an interruptibility score based on the context data; and
            determining the priority based on the importance level, the urgency level, and the interruptibility score;
        determining a delivery schedule for the notification based on the priority;
        determining a notification delivery plan based on at least one of the context data, priority or delivery schedule; and
        transmitting the notification to a display device.

8. The system of claim 7, wherein when using the plurality of sensors to extract the context data pertaining to the notification or the user of the client device, the processor being configured to perform operations comprising:
    receiving data via at least one of the plurality of sensors, wherein the data comprises data pertaining to the user of the client device or data of an environment in which the client device is located, the processor being configured to perform operations comprising
    determining the context data based on at least one of the data pertaining to the user of the client device or the data of the environment in which the client device is located.

9. The system of claim 7 wherein the interruptibility score may indicate a cost of interruption.

10. The system of claim 9, wherein when determining the delivery schedule for the notification based on the priority, the processor being configured to perform operations comprising determining an immediate delivery schedule for the notification when the importance level, the urgency level, and the interruptibility score each meet respective threshold criteria.

11. The system of claim 9, wherein when determining the delivery schedule for the notification based on the priority, the processor being configured to perform operations comprising determining a delayed delivery schedule for the notification when at least two of the importance level, the urgency level, and the interruptibility score each meet respective threshold criteria.

12. The system of claim 7, wherein the notification delivery plan includes a delivery modality of at least one of a visual notification, a sound notification, or a vibration notification.

13. A non-transitory computer-readable medium having encoded therein programming code executable by a processor to perform or control performance of operations comprising:
    identifying a notification;
    in response to identifying the notification, using a plurality of sensors to extract context data pertaining to the notification or a user of a client device;
    determining a priority for the notification based on the context data by:
        estimating an importance level and an urgency level for the notification based on the context data;
        determining an interruptibility score based on the context data; and
        determining the priority based on the importance level, the urgency level, and the interruptibility score;
    determining a delivery schedule for the notification based on the priority;
    determining a notification delivery plan based on at least one of the context data, priority or delivery schedule; and
    transmitting the notification to a display device.

14. The non-transitory computer-readable medium of claim 13, wherein using the plurality of sensors to extract the context data pertaining to the notification or the user of the client device comprises:

receiving data via at least one of the plurality of sensors, wherein the data comprises data pertaining to the user of the client device or data of an environment in which the client device is located, the operations further comprising determining the context data based on at least one of the data pertaining to the user of the client device or the data of the environment in which the client device is located.

15. The non-transitory computer-readable medium of claim 13, wherein the interruptibility score may indicate a cost of interruption.

16. The non-transitory computer-readable medium of claim 15, wherein the determining the delivery schedule for the notification based on the priority comprises determining an immediate delivery schedule for the notification when the importance level, the urgency level, and the interruptibility score each meet respective threshold criteria.

17. The non-transitory computer-readable medium of claim 15, wherein the determining the delivery schedule for the notification based on the priority comprises determining a delayed delivery schedule for the notification when at least two of the importance level, the urgency level, and the interruptibility score each meet respective threshold criteria.

* * * * *